United States Patent
Yang et al.

(10) Patent No.: US 12,264,467 B2
(45) Date of Patent: Apr. 1, 2025

(54) MICROWAVE INDUCTION CONTROL SYSTEM, CONTROL METHOD, AND CONTROL DEVICE FOR WATER OUTLET DEVICE

(71) Applicant: Shanghai Kohler Electronics, Ltd., Shanghai (CN)

(72) Inventors: Lei Yang, Shanghai (CN); Yong Ji, Shanghai (CN)

(73) Assignee: Shanghai Kohler Electronics, Ltd, Shanghai (CN)

( * ) Notice: Subject to any disclaimer, the term of this patent is extended or adjusted under 35 U.S.C. 154(b) by 597 days.

(21) Appl. No.: 17/524,461

(22) Filed: Nov. 11, 2021

(65) Prior Publication Data

US 2022/0154437 A1  May 19, 2022

(30) Foreign Application Priority Data

Nov. 17, 2020  (CN) .......................... 202011287897.2

(51) Int. Cl.
*E03C 1/05*  (2006.01)
*F16K 31/06*  (2006.01)
(Continued)

(52) U.S. Cl.
CPC .......... *E03C 1/057* (2013.01); *F16K 31/0644* (2013.01); *G01S 13/04* (2013.01); *G05B 15/02* (2013.01); *G05D 7/0635* (2013.01)

(58) Field of Classification Search
CPC .. E03C 1/057; F16K 31/0644; F16K 31/0675; G01S 13/04; G01S 7/356;
(Continued)

(56) References Cited

U.S. PATENT DOCUMENTS

2007/0029261 A1*  2/2007  Chew ........................ C02F 1/48
                                                      210/243
2009/0031493 A1*  2/2009  Tsujita ..................... G01S 13/88
                                                      4/623
(Continued)

FOREIGN PATENT DOCUMENTS

CN      101896670 A      11/2010
CN      103774735 A       5/2014
(Continued)

OTHER PUBLICATIONS

Chinese Office Action issued in connection with CN Appl. Ser. No. 202011287897.2 dated Feb. 28, 2023 (10 pages).
(Continued)

*Primary Examiner* — Kidest Bahta
(74) *Attorney, Agent, or Firm* — Lempia Summerfield Katz LLC

(57) ABSTRACT

The present disclosure relates to a microwave induction control system for a water outlet device. The system includes a microwave inductor and a solenoid valve, which controls an inlet pipe and an outlet pipe to be connected with each other or disconnected from each other. The microwave inductor includes a transmitting antenna and at least one receiving antenna for receiving at least one radio frequency echo signal. The transmitting antenna transmits electromagnetic waves toward a water outlet of the outlet pipe. The microwave inductor further includes a control device communicatively connected to the solenoid valve. The control device analyzes the at least one radio frequency echo signal received by the at least one receiving antenna and drives the solenoid valve to control the inlet pipe and the outlet pipe to be connected with each other or disconnected from each other according to the analysis result.

19 Claims, 7 Drawing Sheets

(51) Int. Cl.
*G01S 13/04* (2006.01)
*G05B 15/02* (2006.01)
*G05D 7/06* (2006.01)

(58) Field of Classification Search
CPC ........ G01S 7/358; G01S 13/345; G01S 13/42; G01S 13/88; G05B 15/02; G05D 7/0635; H04B 1/40
See application file for complete search history.

(56) References Cited

U.S. PATENT DOCUMENTS

| | | | |
|---|---|---|---|
| 2011/0163926 A1* | 7/2011 | Lucas | H04B 13/02 |
| | | | 343/719 |
| 2013/0160202 A1* | 6/2013 | Murata | E03C 1/057 |
| | | | 4/623 |
| 2017/0195108 A1* | 7/2017 | Liu | H04L 5/1461 |

FOREIGN PATENT DOCUMENTS

| | | | | |
|---|---|---|---|---|
| CN | 103899825 A | * | 7/2014 | ............. F16K 31/06 |
| CN | 107386374 A | | 11/2017 | |
| CN | 206929406 U | * | 1/2018 | |
| CN | 108474846 A | | 8/2018 | |
| CN | 108919270 A | * | 11/2018 | |
| JP | 2006-219891 A | | 8/2006 | |
| JP | 2010-163743 A | | 7/2010 | |

OTHER PUBLICATIONS

Chinese Office Action issued in connection with CN Appl. Ser. No. 202011287897.2 dated May 19, 2022 (10 pages).

* cited by examiner

MICROWAVE INDUCTION CONTROL SYSTEM, CONTROL METHOD, AND CONTROL DEVICE FOR WATER OUTLET DEVICE

CROSS REFERENCE TO RELATED APPLICATION

This application claims the benefit of priority to Chinese Patent Application No. 202011287897.2 filed in the Chinese Intellectual Property Office on Nov. 17, 2020, the contents of which are hereby incorporated by reference in its entirety.

FIELD

The present disclosure relates to the technical field of sanitary ware, in particular to a microwave induction control system, a control method, and a control device for a water outlet device.

BACKGROUND

An automatic faucet usually comprises an inductor and a control valve, wherein the inductor is a core component. At present, infrared sensors are mainly used as inductors of the automatic faucet. The infrared sensors include active inductors and passive inductors, and the infrared active inductors further include ranging and non-ranging types.

The infrared inductors have the main problems as follows:
1) the infrared inductors are easy to be interfered by light, such as strong light or sunshine, which leads to shorter action distance or even failure;
2) windows are usually provided on the faucets or bars, so the infrared inductors are affected by moisture or water mist in the environment of sinks, which is easy to lead to failure; and
3) when the infrared window is covered by foam or stain, the sensitivity decreases seriously.

The microwave sensors have the main problems as follows:
1) due to the size of the sensor, microwave antenna beams are wider, so the microwave sensors are easily interfered by the surroundings, resulting in water waste; and
2) the microwave sensors are greatly influenced by a detection threshold of the sensor, and specifically, the sensor is either too sensitive to cause that the water cannot be turned off in time in case of false triggers, or the sensor is slow to respond or even no water flows.

SUMMARY

Based on the above technical problems, it is necessary to provide a microwave induction control system, a control method, and a control device for a water outlet device to solve the technical problems that the water outlet device cannot reliably and stably detect the water outlet demand and is easily affected by factors such as illumination, color of an object, water flow quantity, and the like.

The present disclosure provides a microwave induction control system for a water outlet device, including a microwave inductor and a solenoid valve, which controls an inlet pipe and an outlet pipe to be connected with each other or disconnected from each other. The microwave inductor includes a transmitting antenna and two receiving antennas for receiving radio frequency echo signals. The transmitting antenna transmits electromagnetic waves toward a water outlet of the outlet pipe, and the two receiving antennas are respectively arranged on two sides of the transmitting antenna. The microwave inductor further includes a control device communicatively connected to the solenoid valve. The control device analyzes the radio frequency echo signals received by the two receiving antennas and drives the solenoid valve to control the inlet pipe and the outlet pipe to be connected with each other or disconnected from each other according to analysis result.

In an embodiment, the microwave inductor further includes a microwave transceiver chip. A radio frequency end of the microwave transceiver chip is communicatively connected to the transmitting antenna and the receiving antennas respectively, and an intermediate frequency end of the microwave transceiver chip is communicatively connected to an input end of the control device. The microwave transceiver chip converts the two radio frequency echo signals received by the two receiving antennas into two in-phase/quadrature (IQ) intermediate frequency signals and sends the two IQ intermediate frequency signals to the control device.

In another embodiment, the radio frequency end of the microwave transceiver chip is communicatively connected to the transmitting antenna and the receiving antennas respectively, a modulation end of the microwave transceiver chip is communicatively connected to an output end of the control device, and the intermediate frequency end of the microwave transceiver chip is communicatively connected to the input end of the control device. The modulation end of the microwave transceiver chip receives a modulation waveform of the control device, generates a corresponding radio frequency modulation waveform as a transmission signal, and sends the transmission signal to the transmission antenna for transmission. Meanwhile, the radio frequency end of the microwave transceiver chip receives the two radio frequency echo signals of the two receiving antennas, mixes the received two radio frequency echo signals with the transmission signal respectively, and then performs frequency selection to obtain the two IQ intermediate frequency signals.

In another embodiment, the microwave inductor further includes a filter and an intermediate frequency amplifier. The intermediate frequency end of the microwave transceiver chip is communicatively connected to the input end of the control device by the filter and the intermediate frequency amplifier successively. A distance corresponding to an allowable passing frequency of the filter is greater than or equal to a distance between the transmitting antenna and the water outlet.

In another embodiment, the microwave inductor is installed below a side of a basin under the faucet, the transmitting antenna faces directly opposite to the outlet pipe, and the two receiving antennas are symmetrically arranged about a plane in which the transmitting antenna and the outlet pipe are located.

The present disclosure also provides a control method of the microwave induction control system for the water outlet device as described above, including:
analyzing the radio frequency echo signals received by the two receiving antennas; and
driving the solenoid valve to control the inlet pipe and the outlet pipe to be connected with each other or disconnected from each other according to analysis result.

In an embodiment, the step of analyzing the radio frequency echo signals received by the two receiving antennas includes:
calculating a total power spectrum of the radio frequency echo signals received by the two receiving antennas, detecting and recording a maximum amplitude value in the power spectrum, and determining a target angular deviation according to the maximum amplitude value.

The step of driving the solenoid valve to control the inlet pipe and the outlet pipe to be connected with each other or disconnected from each other according to analysis result includes:

judging/determining whether an effective target object is present/exists according to the target angular deviation and the maximum amplitude value; if the effective target object is present, driving the solenoid valve to control the inlet pipe to be connected to the outlet pipe; otherwise, driving the solenoid valve to control the inlet pipe to be disconnected from the outlet pipe.

In another embodiment, the steps of calculating a total power spectrum of the radio frequency echo signals received by the two receiving antennas, detecting and recording a maximum amplitude value in the power spectrum, and determining a target angular deviation according to the maximum amplitude value include:

converting the two radio frequency echo signals into two IQ intermediate frequency signals respectively;

after each preset frame of time, acquiring the two IQ intermediate frequency signals as one frame of data; and for each frame of data, performing the following calculations:

performing analog-to-digital conversion on the two IQ intermediate frequency signals respectively, to obtain two IQ time-domain complex signals respectively;

performing frequency-domain transform processing on the two IQ time-domain complex signals respectively to obtain IQ frequency-domain complex signals corresponding to each IQ complex signal, wherein each IQ frequency-domain complex signal includes a plurality of frequency-domain complex signal sampling values, wherein each frequency-domain complex signal sampling value corresponds to a distance and a speed, and wherein a corresponding relationship between the frequency-domain complex signal sampling value and the distance and a corresponding relationship between the frequency-domain complex signal sampling value and the speed are obtained by the frequency-domain transform processing;

calculating a total power spectrum of the two IQ frequency-domain complex signals, wherein the power spectrum includes a plurality of amplitude values corresponding to the distance and the speed;

detecting and recording a maximum amplitude value in the power spectrum;

determining a distance corresponding to the maximum amplitude value as a maximum amplitude distance;

in the first IQ frequency-domain complex signal, searching a frequency-domain complex signal sampling value corresponding to the maximum amplitude distance as a first to-be-compared complex signal sampling value, and in the second IQ frequency-domain complex signal, searching a frequency-domain complex signal sampling value corresponding to the maximum amplitude distance as a second to-be-compared complex signal sampling value; and calculating a phase difference between the first to-be-compared complex signal sampling value and the second to-be-compared complex signal sampling value as the target angular deviation.

In another embodiment, the step of determining whether an effective target object is present according to the target angular deviation and the maximum amplitude value includes:

if the maximum amplitude value is greater than an amplitude threshold, the target angular deviation is less than an angle threshold, an absolute value of the speed corresponding to the maximum amplitude value is greater than a speed threshold, and the speed corresponding to the maximum amplitude value points has a direction toward the water outlet, determining that the effective target object is present.

In another embodiment, the step of determining whether an effective target object is present according to the target angular deviation and the maximum amplitude value specifically includes:

if the maximum amplitude value is greater than the amplitude threshold, the target angular deviation is less than the angle threshold, the absolute value of the speed corresponding to the maximum amplitude value is greater than the speed threshold, and the speed corresponding to the maximum amplitude value points has the direction toward the water outlet, preliminarily determining that the target object exists; and if it is preliminarily determined that the target object is present in N or more than N frames in continuous M frames, determining that the target object is present.

In another embodiment, the method further includes:

in every preset threshold detection time, performing the following operations:

acquiring maximum amplitude values of power spectrums of continuous multiple frames, to form a frame sequence including a plurality of maximum amplitude values;

sorting the plurality of maximum amplitude values and taking/obtaining an intermediate portion of the plurality of maximum amplitude values to calculate an average value to obtain an initial amplitude threshold;

multiplying current amplitude threshold by a preset first weighted value N1 to obtain a weighted detection threshold, wherein the first weight value is greater than 1; and if the initial amplitude threshold is less than the weighted detection threshold, updating the current amplitude threshold to be a weighted value of the initial amplitude threshold and the current amplitude threshold.

In another embodiment, the step of updating the current amplitude threshold to be a weighted value of the initial amplitude threshold and the current amplitude threshold includes:

if current amplitude threshold is greater than the initial amplitude threshold, updating the current amplitude threshold to be $A1 \times N2 + A2 \times N3$, wherein A1 is the initial amplitude threshold, N2 is a second weighted value, N3 is a third weighted value, A2 is the current amplitude threshold, and N2 is greater than N3; and if current amplitude threshold is less than or equal to the initial amplitude threshold, updating the current amplitude threshold to be $A1 \times N3 + A2 \times N2$, wherein A1 is the initial amplitude threshold, N2 is the second weighted value, N3 is the third weighted value, A2 is the current amplitude threshold, and N2 is greater than N3.

The present disclosure also provides a control device of the microwave induction control system of the water outlet device as described above, including:

at least one processor; and, a memory communicatively connected to the at least one processor.

The memory stores instructions that can be executed by the at least one processor. The instructions are executed by the at least one processor, so that the at least one processor can execute all the steps of the control method of the microwave induction control system for the water outlet device as described above.

The microwave induction control system of the water outlet device provided by the present disclosure has no requirement for a shape and a material of a faucet, so that the microwave induction control system can be adapted to and control various faucets with different shapes. The microwave working mechanism avoids the problems of misjudgment and missed judgment, which may be caused by the infrared window being moist or polluted. By analyzing the radio frequency echo signals of the two receiving antennas, the detection reliability is improved.

BRIEF DESCRIPTION OF THE FIGURES

The present disclosure is further described in detail hereinafter with reference to the accompanying drawings and the specific embodiments.

DESCRIPTION OF REFERENCE NUMERALS

1—microwave inductor; 11—transmitting antenna; 12—receiving antenna; 13—control device; 131—analogue-to-digital conversion module; 132—to-be-detected data generating module; 133—detection threshold generating module; 134—target judgment module; 14—microwave transceiver chip; 15—intermediate frequency amplifier; 16—solenoid valve driving circuit; 2—solenoid valve; 3—inlet pipe; 4—water outlet; 5—basin; 6—outlet pipe; and 7—connector wire.

DETAILED DESCRIPTION

The present disclosure will be further described in detail below with reference to the accompanying drawings and specific embodiments.

First Embodiment

Figure 1:
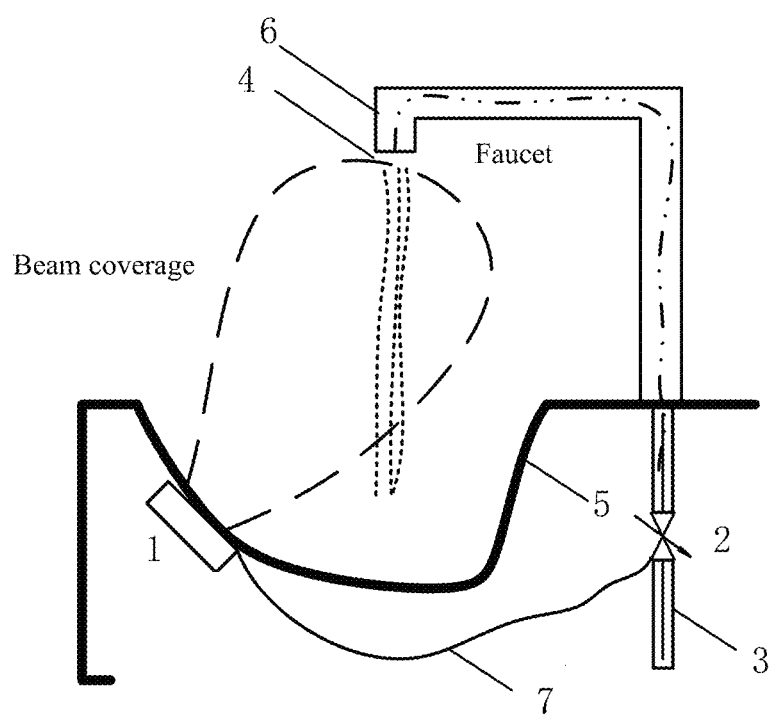
FIG. 1 is a schematic structure diagram of a microwave induction control system for a water outlet device according to the present disclosure.
Figure 2:
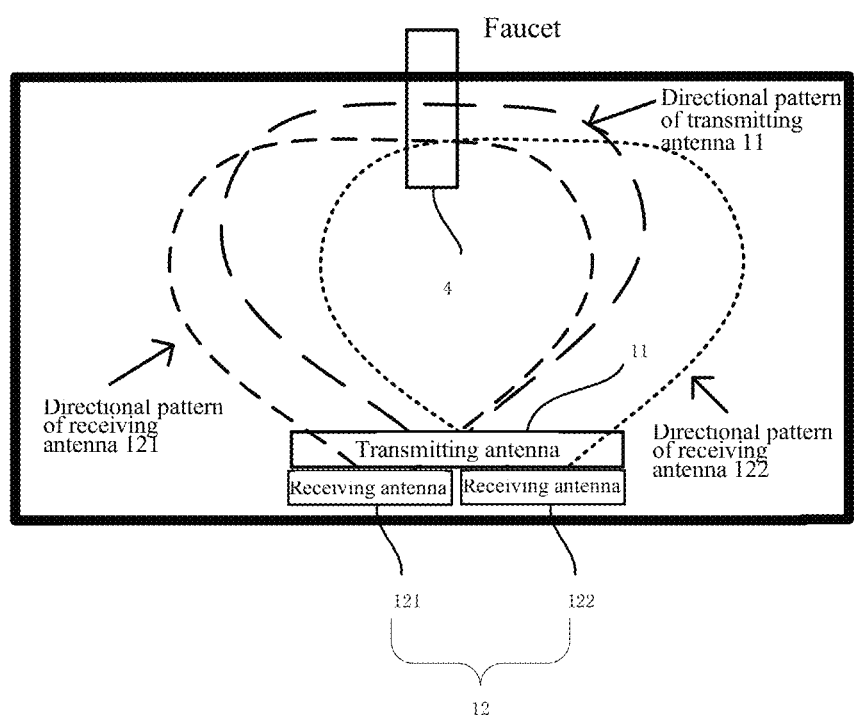
FIG. 2 is a top view of the microwave induction control system for the water outlet device according to the present disclosure.
Figure 3:
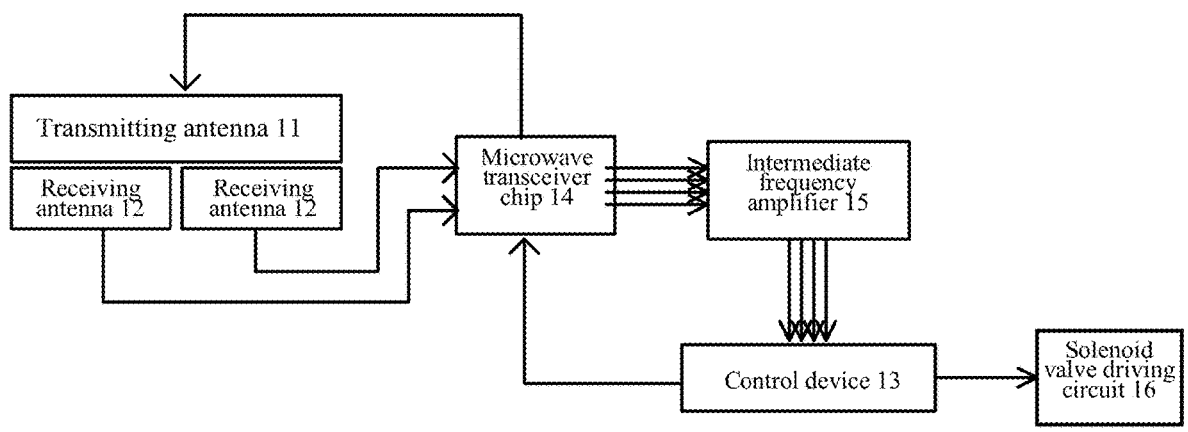
FIG. 3 is a system schematic diagram of a microwave inductor according to an embodiment of the present disclosure.

FIG. 1 is a schematic structure diagram of a microwave induction control system for a water outlet device according to the present disclosure. FIG. 2 is a top view of the microwave induction control system for the water outlet device according to the present disclosure. FIG. 3 is a system schematic diagram of a microwave inductor according to an embodiment of the present disclosure.

As shown in FIG. 1 to FIG. 3, a microwave induction control system for a water outlet device according to the first embodiment of the present disclosure includes a microwave inductor 1 and a solenoid valve 2, which controls an inlet pipe 3 and an outlet pipe 6 to be connected with each other or disconnected from each other, wherein the microwave inductor 1 includes a transmitting antenna 11 and two receiving antennas 12 for receiving radio frequency echo signals. The transmitting antenna 11 emits electromagnetic waves toward a water outlet 4 of the outlet pipe 6, and the two receiving antennas 12 are respectively arranged on two sides of the transmitting antenna 11. The microwave inductor 1 further includes a control device 13. The control device 13 is communicatively connected to the solenoid valve 2. The control device 13 analyzes the radio frequency echo signals received from the two receiving antennas 12 and drives the solenoid valve 2 to control the inlet pipe 3 and the outlet pipe 6 to be connected with each other or disconnected from each other according to the analysis result.

Specifically, the water outlet device of the present disclosure is a water outlet device in a bathroom device, for example, a faucet. As shown in FIG. 1, when a hand reaches below the water outlet 4, the electromagnetic waves emitted by the transmitting antenna 11 are reflected to become the radio frequency echo signals, which will be received by the receiving antennas 12. As shown in FIG. 2, the transmitting antenna 11 faces toward the water outlet 4, and the two receiving antennas 121 and 122 are respectively arranged on two sides of the transmitting antenna 11. Therefore, by analyzing the two radio frequency echo signals received by the two receiving antennas 12, it can be determined whether a target object is detected, so as to improve the detection accuracy.

When the target object is detected, the microwave inductor 1 drives the solenoid valve 2 to connect the water inlet pipe 3 to the water outlet pipe 6. When no target object is detected, the microwave inductor 1 drives the solenoid valve 2 to disconnect the water inlet pipe 3 from the water outlet pipe 6. Specifically, the solenoid valve 2 may be driven by a solenoid valve driving circuit 16.

Because the microwave inductor 1 is independent of the water outlet device, the present disclosure can adapt to and control various water outlet devices having different shapes. Meanwhile, a microwave working mechanism of the microwave inductor 1 avoids the problems of misjudgment or missed judgment (e.g., errors in the target object detection), which may be caused by an infrared window being moist or polluted.

The microwave induction control system for the water outlet device provided by the present disclosure has no requirement for shape or material of a faucet, so that the microwave induction control system can be adapted to and control various faucets with different shapes. The microwave working mechanism avoids the problems of misjudgment or missed judgment, which may be caused by the infrared window being moist or polluted. By analyzing the radio frequency echo signals for the two receiving antennas, the detection reliability is improved.

In one embodiment, the microwave inductor 1 further includes a microwave transceiver chip 14. A radio frequency end of the microwave transceiver chip 14 is communicatively connected to the transmitting antenna 11 and the receiving antennas 12 respectively, and an intermediate frequency end of the microwave transceiver chip 14 is communicatively connected to an input of the control device 13. The microwave transceiver chip 14 converts the two radio frequency echo signals received from the two receiving antennas 12 into two IQ intermediate frequency signals and sends the two IQ intermediate frequency signals to the control device 13.

Specifically, as shown in FIG. 3, the microwave inductor 1 further includes the microwave transceiver chip 14. The microwave transceiver chip 14 controls the transmitting antenna 11 to transmit electromagnetic waves and converts the two radio frequency echo signals received by the receiving antennas 12 into two IQ intermediate frequency signals.

In this embodiment, the microwave transceiver chip is added to control transmitting and receiving of the antennas.

In one embodiment, the radio frequency end of the microwave transceiver chip 14 is communicatively connected to the transmitting antenna 11 and the receiving antennas 12 respectively. A modulation input of the microwave transceiver chip 14 is communicatively connected to an output of the control device 13, and the intermediate frequency end of the microwave transceiver chip 14 is communicatively connected to the input of the control device 13. The modulation end of the microwave transceiver chip 14 receives a modulation waveform of the control device 13, generates a corresponding radio frequency modulation waveform as a transmission signal, and sends the transmission signal to the transmission antenna 11 for transmission. Meanwhile, the radio frequency input of the microwave transceiver chip 14 receives the two radio frequency echo signals of the two receiving antennas 12, mixes the received two radio frequency echo signals with the transmission signal respectively, and then performs frequency selection to obtain two IQ intermediate frequency signals.

In this embodiment, the transmitted signal is mixed with the received signal, thus avoiding the problems of misjudgment and missed judgment, which may be caused by the infrared window being moist or polluted.

In one embodiment, the microwave inductor 1 further includes a filter and an intermediate frequency amplifier 15. The intermediate frequency output of the microwave transceiver chip 14 is communicatively connected to the input of the control device 13 by the filter and the intermediate frequency amplifier 15 successively. A distance corresponding to an allowable passing frequency (e.g., cutoff frequency) of the filter is greater than or equal to a distance between the transmitting antenna 11 and the water outlet 4.

Specifically, the filter is a low pass filter. The allowable passing frequency of the filter corresponds to the distance between the transmitting antenna 11 and the water outlet 4.

In this embodiment, frequency selection is realized through the filter, so that misjudgment caused by detecting objects at other distances is reduced.

In one embodiment, the microwave inductor 1 is installed below a side of a basin 5 under the faucet, the transmitting antenna 11 faces directly opposite to the outlet pipe 6, and the two receiving antennas 12 are symmetrically arranged about a plane in which the transmitting antenna 11 and the outlet pipe 6 are located.

In this embodiment, the microwave inductor is installed below a side of the basin under the faucet, and there is no requirement for the shape and the material of the faucet, so that the microwave induction control system can be adapted to and control various faucets having different shapes. Further, the transmitting antenna faces directly opposite to the outlet pipe, and the two receiving antennas are symmetrical about the plane in which the transmitting antenna and the outlet pipe are located. Therefore, by comparing the two radio frequency echo signals received by the two receiving antennas, it can be determined whether the target is in the plane and thus it can be ensured that the water flows from the water outlet only when the target is in front of the outlet pipe and avoiding misjudgment.

Figure 4:
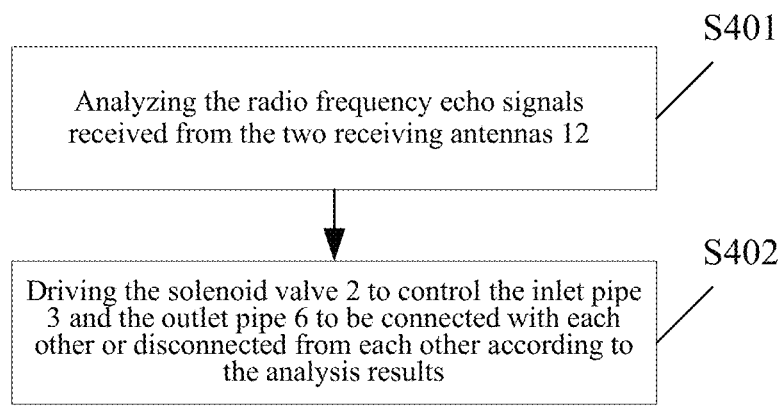
FIG. 4 is a working flowchart of a control method of the microwave induction control system for the water outlet device as described above according to the present disclosure.

FIG. 4 is a working flowchart of a control method of the microwave induction control system for the water outlet device as described above according to the present disclosure, including:
    step S401: analyzing the radio frequency echo signals received from the two receiving antennas 12; and
    step S402: driving the solenoid valve 2 to control the inlet pipe 3 and the outlet pipe 6 to be connected with each other or disconnected from each other according to the analysis results.

Specifically, the control method of the present disclosure is applied in the control device of the microwave induction control system for the water outlet device as described above. In step S401, by analyzing the radio frequency echo signals received by the two receiving antennas 12, it can be determined whether a target object is detected, so as to improve the detection accuracy.

When the target object is detected, the microwave inductor 1 sends information to the solenoid valve 2 to connect the water inlet pipe 3 to the water outlet pipe 6. When no target object is detected, the microwave inductor 1 sends information to the solenoid valve 2 to disconnect the water inlet pipe 3 from the water outlet pipe 6.

Because the microwave inductor 1 is independent of the water outlet device, the present disclosure can adapt to and control various water outlet devices with different shapes. Further, the microwave working mechanism of the microwave inductor 1 avoids the problems of misjudgment and missed judgment, which may be caused by an infrared window being moist or polluted.

In one embodiment, the step of analyzing the radio frequency echo signals received from the two receiving antennas 12 specifically includes:
    calculating a total power spectrum of the radio frequency echo signals received by the two receiving antennas 12, detecting and recording a maximum amplitude value in the power spectrum, and determining a target angular deviation according to the maximum amplitude value.

The step of driving the solenoid valve 2 to control the inlet pipe 3 and the outlet pipe 6 to be connected with each other or disconnected from each other according to the analysis results specifically includes:
    judging/determining whether an effective target object exists according to the target angular deviation and the maximum amplitude value; if the effective target object exists, driving the solenoid valve 2 to control the inlet pipe 3 to be connected to the outlet pipe 6; otherwise, driving the solenoid valve 2 to control the inlet pipe 3 to be disconnected from the outlet pipe 6.

Specifically, whether the target object is detected is determined by the maximum amplitude value, and whether the target object is located between the two receiving antennas 12 is determined by comparing the two radio frequency echo signals received by the two receiving antennas 12 and according to the target angular deviation. The target angular deviation indicates an angular difference between a receiving angle of one receiving antenna 12 and a receiving angle of the other receiving antenna 12. Since the two receiving antennas 12 are located at two sides of the transmitting antenna 11 and the transmitting antenna 11 faces the water outlet 4, detecting whether the target object is located between the two receiving antennas 12 means detecting whether the target object faces the water outlet 4, so as to avoid the water flowing out of the water outlet when the target object deviates from the water outlet 4. For the faucet shown in FIG. 3, the water outlet 4 is the faucet position.

In this embodiment, whether the effective target exists is determined by the maximum amplitude value and the target angular deviation, and the detection accuracy is improved.

In one embodiment, the steps of calculating the total power spectrum of the radio frequency echo signals received by the two receiving antennas 12, detecting and recording the maximum amplitude value in the power spectrum, and determining the target angular deviation according to the maximum amplitude value specifically include:

converting the two radio frequency echo signals into two IQ intermediate frequency signals respectively;

after each preset frame of time, acquiring the two IQ intermediate frequency signals as one frame of data; and for each frame of data, performing the following calculations:

performing analog-to-digital conversion on the two IQ intermediate frequency signals respectively, to obtain two IQ time-domain complex signals respectively;

performing frequency-domain transform processing on the two IQ time-domain complex signals respectively, to obtain IQ frequency-domain complex signals corresponding to each IQ complex signal, wherein each IQ frequency-domain complex signal includes a plurality of frequency-domain complex signal sampling values, wherein each frequency-domain complex signal sampling value corresponds to a distance and a speed, and wherein a corresponding relationship between the frequency-domain complex signal sampling value and the distance and a corresponding relationship between the frequency-domain complex signal sampling value and the speed are obtained by the frequency-domain transform processing;

calculating a total power spectrum of the two IQ frequency-domain complex signals, wherein the power spectrum includes a plurality of amplitude values corresponding to the distance and the speed;

detecting and recording a maximum amplitude value in the power spectrum;

determining a distance corresponding to the maximum amplitude value as a maximum amplitude distance;

in a first IQ frequency-domain complex signal, searching a frequency-domain complex signal sampling value corresponding to the maximum amplitude distance as a first to-be-compared complex signal sampling value, and in a second IQ frequency-domain complex signal, searching a frequency-domain complex signal sampling value corresponding to the maximum amplitude distance as a second to-be-compared complex signal sampling value; and calculating a phase difference between the first to-be-compared complex signal sampling value and the second to-be-compared complex signal sampling value as the target angular deviation.

Figure 8:
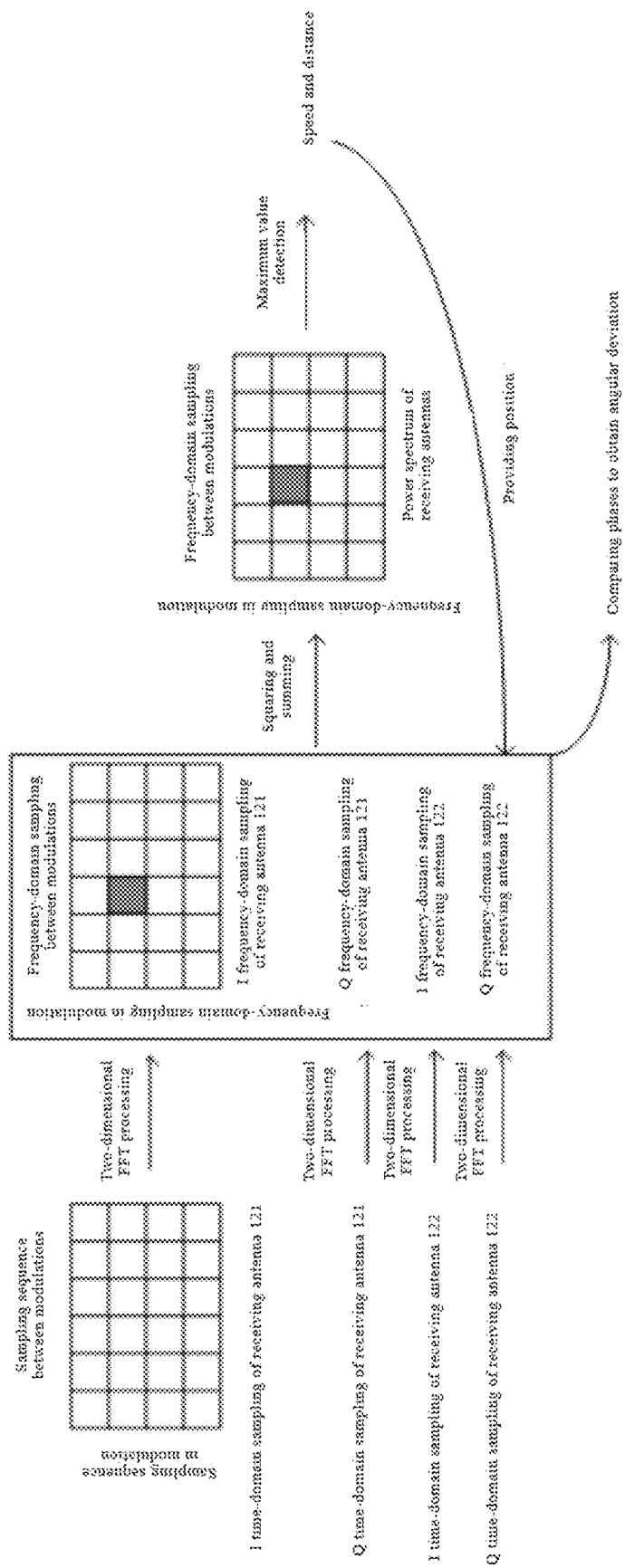
FIG. 8 is a schematic diagram of processing two IQ time-domain complex signals according to an embodiment of the present disclosure.

FIG. 8 is a schematic diagram of processing two IQ time-domain complex signals according to an embodiment of the present disclosure.

Specifically, as shown in FIG. 8, each IQ time-domain complex signal includes a corresponding I time-domain signal and a corresponding Q time-domain signal. A frequency-domain transform processing is performed on the two IQ time-domain complex signals to obtain IQ frequency-domain complex signal corresponding to each IQ complex signal. Each IQ frequency-domain complex signal includes an I frequency-domain signal transformed from the I time-domain signal and a Q frequency-domain signal transformed from the Q time-domain signal.

Each frequency-domain complex signal sampling value includes an I frequency-domain signal sampling value in the I frequency-domain signal and a Q frequency-domain signal sampling value in the Q frequency-domain signal. Each I frequency-domain signal sampling value corresponds to a Q frequency-domain signal sampling value, and each I frequency-domain signal sampling value corresponds to a speed and a distance. The Q frequency-domain signal sampling value corresponding to the I frequency-domain signal sampling value corresponds to the same speed and the same distance. The corresponding relationship between the frequency-domain complex signal sampling values and the speed, the distance may constitute a two-dimensional list. An abscissa of the two-dimensional list represents the distance, and an ordinate of the two-dimensional list represents the speed. An intersection of the distance and the speed represents the frequency-domain complex signal sampling value, which includes the I frequency-domain signal sampling value and the Q frequency-domain signal sampling value.

Then, the total power spectrum of the two frequency-domain complex signals is calculated. The specific calculation method is to square the two frequency-domain complex signals respectively and then sum the squared results. That is, the frequency-domain complex signal sampling values included in the two frequency-domain complex signals are squared one by one. The frequency-domain complex signal sampling values at the same speed and the same distance in the two frequency-domain complex signals are respectively squared and then summed, so as to obtain a plurality of amplitude values. Each amplitude value is associated with a speed and a distance. The corresponding relationship between the amplitude value and the distance, the speed constitutes a two-dimensional list. An abscissa of the two-dimensional list represents the distance, an ordinate of the two-dimensional list represents the speed, and an intersection of the distance and the speed represents the amplitude value.

Figure 7:
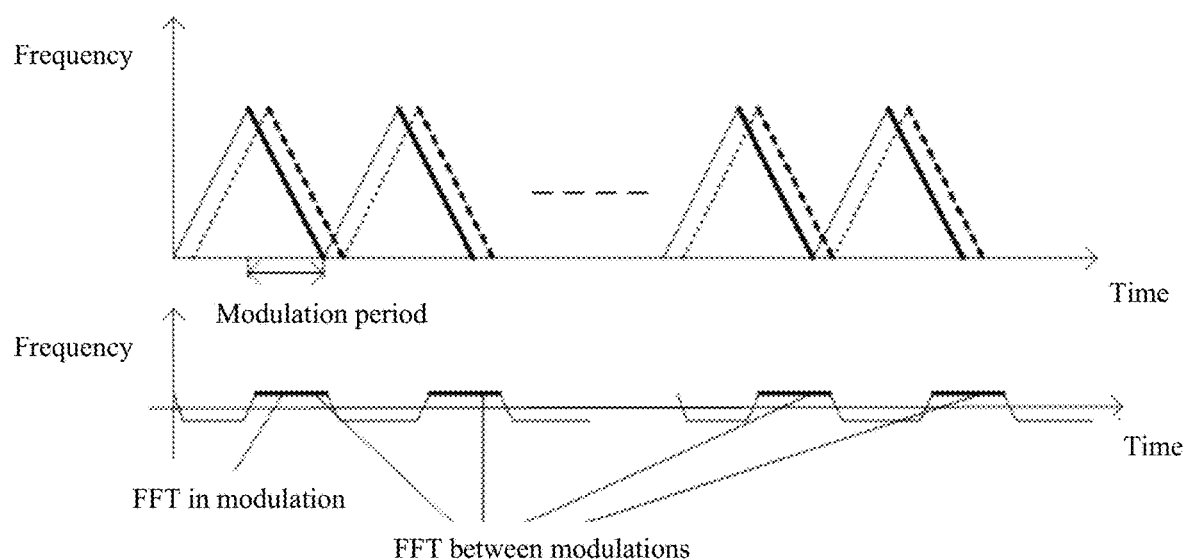
FIG. 7 is a time-frequency schematic diagram of Fast Fourier transform (FFT)

FIG. 7 is a time-frequency schematic diagram of FFT transform. As shown in FIG. 7, a plurality of frequency-domain complex signal sampling values and corresponding distances can be obtained by performing distance-dimension Fast Fourier Transform (FFT) processing of a single modulation period on the two IQ time-domain complex signals. The speed corresponding to each frequency-domain complex signal sampling value can be obtained by performing pulse-dimension FFT processing of a plurality of modulation periods on the two IQ time-domain complex signals.

A maximum amplitude value is searched, and a distance corresponding to the maximum amplitude value is recorded as a maximum amplitude distance. From the two frequency-domain complex signals, a frequency-domain complex signal sampling value corresponding to the maximum amplitude distance is searched in the first IQ frequency-domain complex signal and used as a first to-be-compared complex signal sampling value. A frequency-domain complex signal sampling value corresponding to the maximum amplitude distance is searched in the second IQ frequency-domain complex signal and used as a second to-be-compared complex signal sampling value.

Since the frequency-domain complex signal sampling values are complex numbers, the first to-be-compared complex signal sampling value and the second to-be-compared complex signal sampling value both have phases. A phase difference between the first to-be-compared complex signal sampling value and the second to-be-compared complex signal sampling value is calculated as the target angular deviation.

In this embodiment, the maximum amplitude value is searched through the power spectrum, and on this basis, the phase difference of the target object in the two IQ signals is determined.

In one embodiment, the step of determining whether the effective target object is present/exists according to the target angular deviation and the maximum amplitude value specifically includes:
  if the maximum amplitude value is greater than an amplitude threshold, the target angular deviation is less than an angle threshold, an absolute value of the speed corresponding to the maximum amplitude value is greater than a speed threshold, and the speed corresponding to the maximum amplitude value points has a direction toward the water outlet 4, determining that the effective target object exists. In another embodiment, the step of determining whether the effective target object is present/exists may be performed by only comparing the maximum amplitude value and the amplitude threshold.

In this embodiment, when the maximum amplitude value is greater than the amplitude threshold, it means that the target is detected. At this time, it is determined whether the target angular deviation is less than the angle threshold, so as to determine whether the target is located in the middle of the two receiving antennas. Meanwhile, it is determined whether the target is close to the water outlet by detecting the absolute value and direction of the speed, so as to determine whether the target is effective.

In one embodiment, the step of determining whether the effective target object exists according to the target angular deviation and the maximum amplitude value specifically includes:
  if the maximum amplitude value is greater than the amplitude threshold, the target angular deviation is less than the angle threshold, the absolute value of the speed corresponding to the maximum amplitude value is greater than the speed threshold, and the speed corresponding to the maximum amplitude value points has the direction toward the water outlet 4, preliminarily determining that the target object exists; and
  if it is preliminarily determined that the target object exists in N or more than N frames in continuous M frames, determining that the target object exists.

In this embodiment, the error in judgment is further reduced.

In one embodiment, the method further includes:
  in every preset threshold detection time, performing the following operations:
  acquiring maximum amplitude values of power spectrums of continuous multiple frames, to form a frame sequence including a plurality of maximum amplitude values;
  sorting the plurality of maximum amplitude values and taking/obtaining intermediate portions of the maximum amplitude values to calculate an average value to obtain an initial amplitude threshold;
  multiplying current amplitude threshold by a preset first weighted value N1 to obtain a weighted detection threshold, wherein the first weight value is greater than 1; and
  if the initial amplitude threshold is less than the weighted detection threshold, updating current amplitude threshold to be a weighted value of the initial amplitude threshold and the current amplitude threshold.

In this embodiment, the step of updating the amplitude threshold is added to adapt to environmental changes.

In one embodiment, the step of updating current amplitude threshold to be a weighted value of the initial amplitude threshold and the current amplitude threshold specifically includes:
  if current amplitude threshold is greater than the initial amplitude threshold, updating the current amplitude threshold to be $A1 \times N2 + A2 \times N3$, wherein A1 is the initial amplitude threshold, N2 is a second weighted value, N3 is a third weighted value, A2 is the current amplitude threshold, and N2 is greater than N3; or
  if current amplitude threshold is less than or equal to the initial amplitude threshold, updating the current amplitude threshold to be $A1 \times N3 + A2 \times N2$, wherein A1 is the initial amplitude threshold, N2 is the second weighted value, N3 is the third weighted value, A2 is the current amplitude threshold, and N2 is greater than N3.

In this embodiment, the larger weighted value is multiplied by the minimum value of the current amplitude threshold and the initial amplitude threshold, so that the amplitude threshold increases slowly but decreases rapidly, so as to avoid the sensitivity being decreased due to the excessively high amplitude threshold.

Figure 5:
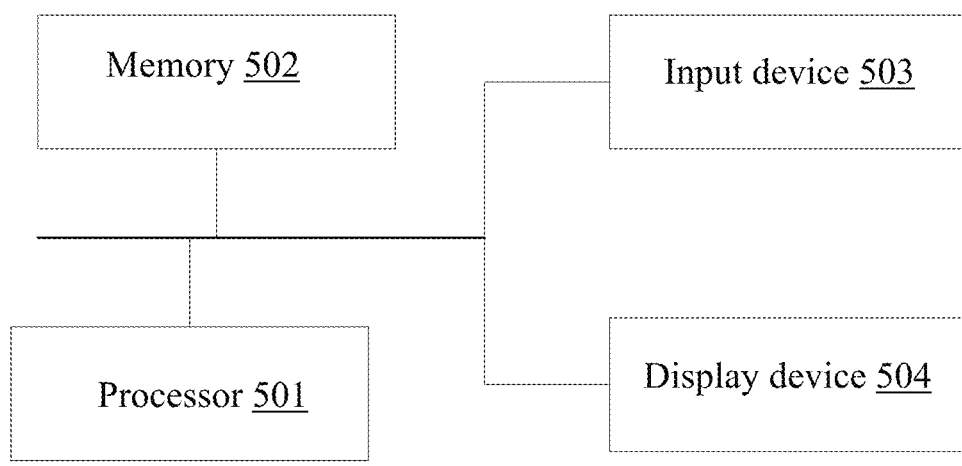
FIG. 5 is a schematic diagram of a hardware structure of a control device of the microwave induction control system for the water outlet device as described above according to an embodiment of the present disclosure.

FIG. 5 is a schematic diagram of a hardware structure of a control device of the microwave induction control system for the water outlet device as described above according to an embodiment of the present disclosure. The control device includes:
  at least one processor 501; and
  a memory 502 communicatively connected to the at least one processor 501.

The memory 502 stores instructions that can be executed by the at least one processor, so that the at least one processor can execute all the steps of the control method of the microwave induction control system for the water outlet device as described above.

In FIG. 5, one processor 502 is taken as an example.

The control device may further include an input device 503 and a display device 504.

The components of the control device may communicate using bus. The controller may be connected to a workstation or another external device (e.g., control panel, remote) and/or a database for receiving user inputs, system characteristics, and any of the values described herein. Optionally, the control device may include an input device 503 and/or a sensing circuit in communication with any of the sensors. The sensing circuit receives sensor measurements from as described above. Optionally, the control device may include a drive unit for receiving and reading non-transitory computer media having instructions. Additional, different, or fewer components may be included. The control device may comprise a processor configured to perform instructions stored in memory for executing the algorithms described herein. For example, the processor 501, the memory 502, the input device 503, and the display device 504 may be connected via a bus or other ways. In this figure, bus connection is taken as an example.

As a non-volatile computer-readable storage medium, the memory 502 may be used to store non-volatile software programs, non-volatile computer executable programs and modules, such as program instructions/modules corresponding to the control method of the microwave induction control system for the water outlet device according to the embodiments of the present application, for example, the method shown in the flowchart of FIG. 4.

In FIG. 5, one processor 501 is taken as an example. The processor 501 may be a general purpose or specific purpose processor, an application specific integrated circuit (ASIC), one or more programmable logic controllers (PLCs), one or more field programmable gate arrays (FPGAs), a group of processing components, or other suitable processing components. The processor 501 is configured to execute computer code or instructions stored in memory or received from other computer readable media (e.g., embedded flash memory, local hard disk storage, local ROM, network storage, a remote server, etc.). The processor 501 may be a single device or combinations of devices, such as associated with a network, distributed processing, or cloud computing. The processor 501 executes various functional applications and data processing by running the non-volatile software programs, instructions, and modules stored in the memory 502, i.e., realizes the control method of the microwave induction control system for the water outlet device in the above embodiments.

The memory 502 may include a program storage area and a data storage area, wherein the program storage area may store application programs required by an operating system and at least one function. The data storage area may store data created according to the use of the control method of the microwave induction control system for the water outlet device, or the like. In addition, the memory 502 may include a high-speed random access memory and may also include a non-volatile memory, such as at least one disk memory device, a flash memory device, or other non-volatile solid storage devices. In some embodiments, the memory 502 may optionally include memories remotely located with respect to the processor 501, which may be connected via networks to a temperature controller for executing the control method of the microwave induction control system for the water outlet device. Examples of the networks above include, but are not limited to, the Internet, intranet, local area networks, mobile communication networks, and combinations thereof. The memory 502 may include one or more devices (e.g., memory units, memory devices, storage devices, etc.) for storing data and/or computer code for completing and/or facilitating the various processes described in the present disclosure. Memory 502 may include random access memory (RAM), read-only memory (ROM), hard drive storage, temporary storage, non-volatile memory, flash memory, optical memory, or any other suitable memory for storing software objects and/or computer instructions. Memory 502 may include database components, object code components, script components, or any other type of information structure for supporting the various activities and information structures described in the present disclosure. The memory 502 may be communicably connected to processor 501 via a processing circuit and may include computer code for executing (e.g., by processor 501) one or more processes described herein. For example, the memory 502 may include graphics, web pages, HTML files, XML files, script code, configuration files, or other resources for use in generating graphical user interfaces for display and/or for use in interpreting user interface inputs to make command, control, or communication decisions.

The input device 503 may be configured to receive user click and generate signal inputs related to user settings and function control of the control method of the microwave induction control system of the water outlet device. The display device 504 may include a display screen and other display devices.

When the one or more modules are stored in the memory 502 and run by the one or more processors 501, the control method of the microwave induction control system of the water outlet device in any of the above-mentioned method embodiments is executed.

In addition to ingress ports and egress ports, a communication interface may include any operable connection. An operable connection may be one in which signals, physical communications, and/or logical communications may be sent and/or received. An operable connection may include a physical interface, an electrical interface, and/or a data interface. The communication interface may be connected to a network. The network may include wired networks (e.g., Ethernet), wireless networks, or combinations thereof. The wireless network may be a cellular telephone network, an 802.11, 802.16, 802.20, or WiMax network, a Bluetooth pairing of devices, or a Bluetooth mesh network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

This embodiment provides the control device of the microwave induction control system for the water outlet device, which has no requirement for a shape and a material of a faucet, so that the control device can be adapted to and control various faucets with different shapes. The microwave working mechanism avoids the problems of misjudgment and missed judgment, which may be caused by the infrared window being moist and polluted. By analyzing the radio frequency echo signals of the two receiving antennas, the detection reliability is improved.

The microwave induction control system of the water outlet device according to an embodiment of the present disclosure includes a microwave inductor 1 and a solenoid valve 2. The solenoid valve 2 is connected to an inlet pipe 3 to control water to flow or not to flow through. The microwave sensor 1 transmits and receives electromagnetic waves, detects an induction area, processes the received signals, and compares the processing results with a detection threshold as the basis for controlling the opening and closing of the solenoid valve 2.

As shown in FIG. 1, the microwave inductor 1 is installed below a side of the ceramic basin 5, facing the faucet, i.e., the water outlet 4. As shown in FIG. 3, the microwave inductor 1 includes a transceiver sensor module, a control device 13, an intermediate frequency amplifier 15, and a solenoid valve driving circuit 16.

The transceiver sensor module adopts the modulation waveform of frequency modulation continuous waves and includes a microstrip antenna with one transmitter and two receivers and a microwave transceiver chip 14. One transmitting antenna 11 transmits electromagnetic waves to the detection area, and two receiving antennas 12 are arranged left and right, receiving echo signals and measuring left and right angles of the target by using a phase comparison method. A radio frequency end of the microwave transceiver chip 14 is connected to the antenna with one transmitter and two receivers, a modulation end of the microwave transceiver chip is connected to the control device 13, and an intermediate frequency end of the microwave transceiver chip is connected with the intermediate frequency amplifier 15. The microwave transceiver chip 14 receives the modulation waveform of the control device 13 and generates a corresponding radio frequency modulation waveform. Simultaneously, the microwave transceiver chip 14 receives the radio frequency echo signals of the two receiving antennas 12, mixes the radio frequency echo signals with the transmission signal, and obtains two I and Q intermediate frequency signals through the low pass filter.

The intermediate frequency amplifier 15 is a four-channel amplifying circuit, which performs band-pass amplification on the two I and Q signals respectively and then sends the signals to an analog-to-digital conversion module of the control device 13.

Figure 6:
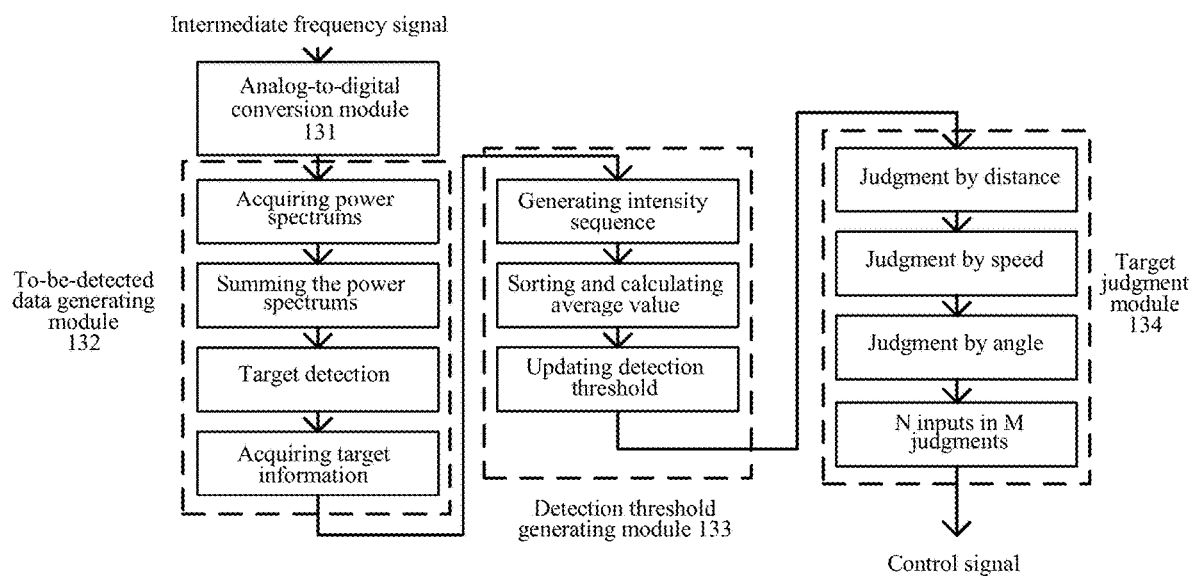
FIG. 6 is a block diagram of the control device according to an embodiment of the present disclosure.

FIG. 6 is a block diagram of the control device according to an embodiment of the present disclosure. As shown in FIG. 6, the control device 13 is specifically a digital processing control device, which includes the analog-to-digital conversion module 131, a to-be-detected data generating module 132, a detection threshold generating module 133, and a target judgment module 134. The analog-to-digital conversion module 131 performs analog-to-digital conversion on the intermediate frequency signals, and then generates two IQ complex signals and sends them to the to-be-detected data generating module 132. The to-be-detected data generating module 132 first removes a direct current component, then performs distance-dimension FFT processing of a single modulation period and pulse-dimension FFT processing of a plurality of modulation periods on the two complex signals, and then squares the two signals and sums the squared signals to calculate a total power spectrum of a receiving channel. As for the power spectrum, maximum amplitude values as well as distances and speeds thereof are detected and recorded, and then a phase difference of the two complex signals is calculated by taking data of corresponding positions in the two complex signals, so as to obtain a target angular deviation. The detection threshold generating module 133 receives maximum amplitudes of the power spectrum to form a frame sequence with a certain length, then sorts the frame sequence according to the amplitudes, takes an intermediate portion to calculate an average value to obtain an initial detection threshold, and then compares the initial detection threshold with a previous threshold. If the initial detection threshold is greater than a weighted threshold of the previous frame, the threshold will not be updated; otherwise, the threshold is weighted and updated according to a size relationship with the previous threshold. The target judgment module 134 firstly makes a first judgment according to whether an intensity of each frame of data exceeds the detection threshold, then makes a second judgment according to the target angle information, and then makes a third judgment according to the absolute value and direction of the speed. A target that passes the triple judgments is put into a First In First Out (FIFO) sequence with a length of M. If there are N valid values in the sequence, it is determined that the effective target exists. Otherwise, it is determined that there is no effective target in the scene.

The solenoid valve driving circuit 16 receives a target presence/absence signal from the control device 13, opens or closes the solenoid valve, and controls on/off of a water flow.

Second Embodiment

In describing the embodiments of the present disclosure, the descriptions regarding the features or functions discussed in the first embodiment are incorporated into the second embodiment. For clarity and brevity, the duplicate descriptions of the relevant features or functions, which have been described in the first embodiment, have been omitted herein.

It should be also appreciated by those having ordinary skill in the art that in other embodiments, the features or functions described in the first embodiment may be added to the second embodiment and the features or functions described in the second embodiment may be added to the first embodiment.

A microwave induction control system according to the second embodiment of the present disclosure may include only one receiving antenna 12 configured to receive radio frequency echo signal.

The microwave induction control system according to the second embodiment of the present disclosure may detect the presence of an object in the detection area of the microwave inductor 1, e.g., the receiving antenna 12. Specifically, the echo signal reflected by an object and received by the receiving antenna 12 may comprise an in-phase ("I signal") and a quadrature signal ("Q signal"). The I signal and the Q signal received by the same receiving antenna 12 correspond to the same speed and the same distance. The speed refers to a speed of an object relative to the transmitting antenna 11, the receiving antenna 12, or the water outlet 4. The distance refers to a distance of an object relative to the transmitting antenna 11, the receiving antenna 12, or the water outlet 4. However, the I signal and the Q signal have a 90-degree phase difference. When the echo signal received by the receiving antenna 12 has a positive 90-degree phase difference, the control device 13 may determine that a target object is approaching a detection area of the receiving antenna 12 and thus may determine that a target object is present. When the echo signal received by the receiving antenna 12 has a negative 90-degree phase difference, the control device 13 may determine that an object is leaving the detection area of the receiving antenna 12 and thus may determine that a target object is not present.

However, the number of the receiving antenna 12 is not limited to one. In another embodiment, the number of the receiving antennas 12 may two, four, or other even numbers. When the number of the receiving antennas 12 may two, four, or other even numbers, the receiving antennas 12 may be symmetrically arranged about the transmitting antenna 11. For example, when the number of the receiving antennas 12 is four, two receiving antennas 12 are disposed on each side of the transmitting antenna 11 at a substantially same distance from each side of the transmitting antenna 11. As illustrated in FIG. 2, when there are two receiving antennas 12, the two receiving antennas may have substantially same size of detection range.

Because there are a lot of interference signals in the environment caused by various unwanted objects, the above configuration may improve the accuracy in detecting the distance of the target object from the transmitting antenna 11.

In an embodiment, the receiving antennas 12 and the transmitting antenna 11 may be arranged on the same printed circuit board (PCB) to reduce the manufacturing costs. Thus, the symmetrical arrangement refers to a symmetrical arrangement on a plane defined by the PCB. In another embodiment, the receiving antennas 12 and the transmitting antenna 11 may be arranged in a three-dimensional space. Thus, the symmetrical arrangement refers to a symmetrical arrangement in the three-dimensional space.

In addition, the microwave induction control system according to the second embodiment of the present disclosure may further detect a distance between a target object and the transmitting antenna 11/the receiving antenna 12/water outlet 4 and thus determine whether the target object is effective. To this end, the distance may be calculated by a time difference between the time when the signal emitted by the transmitting antenna 11 and the time when the echo signal received by the receiving antenna 12. In the related art, the time difference is difficult to obtained when the distance between an object and the transmitting antenna 11/the receiving antenna 12/the water outlet 4 is very small, e.g. 3 feet or 1 meter and when the microwave signals are emitted very quickly (e.g. about 30 km/s).

To address this technical problem, according to the second embodiment of the present disclosure, the time difference may be determined based on a frequency difference between the emitted signal and the echo signal. A larger frequency difference indicates a larger distance between the target object and the transmitting antenna 11/the receiving antenna 12/the water outlet 4. A smaller frequency difference indicates a smaller distance between the target object and the transmitting antenna 11/the receiving antenna 12/the water outlet 4.

Referring to first drawing of FIG. 7, the transmitting antenna 11 may continuously emit the signals, each having a frequency between 24 GHz and 24.025 GHz. During a period, e.g., 600 ms, the frequencies of the emitted signals are controlled to linearly increase and then linearly decrease and thus a triangle wave may be formed (in solid line). Correspondingly, the echo signals may also form a triangle wave (in broken line). Thus, because it takes some time (although very short) for the echo signal to travel and then to be received by the receiving antenna 12, there is a time difference between the two triangle waves.

In order to obtain the frequency difference, the emitted signal and the corresponding echo signal are input into and mixed in a mixer (e.g. a multiplier) and then the mixer may output a new signal (a "frequency difference signal"). The frequency difference signal is processed by an FFT calculation to obtain its frequency (e.g. several KHz). Then, a corresponding relationship between the frequencies of the frequency difference signals and the distances of the object may be established. The corresponding relationship may be in the form of a mathematic function. For example, a 9 KHz frequency may correspond to a 50 cm distance. A larger frequency may indicate a longer time for the receiving antenna 12 to receive the echo signal and thus indicate a larger distance between the object and the transmitting antenna 11/the receiving antenna 12/the water outlet 4. A smaller frequency may indicate a shorter time for the receiving antenna 12 to receive the echo signal and thus indicate a smaller distance between the object and the transmitting antenna 11/the receiving antenna 12/the water outlet 4. By using the established corresponding relationship between the frequencies of the frequency difference signals and the distances, a distance between the object and the transmitting antenna 11/the receiving antenna 12/the water outlet 4 may be obtained when a frequency difference is determined according to the above description.

Furthermore, the microwave induction control system according to the second embodiment of the present disclosure may improve the speed to determine the target object. Not every frequency difference is useful in determining the target object and the distance of the target object because there are a lot of the objects in the environment, which may also reflect the signals emitted by the transmitting antenna 12 or generate interferences signals to form unwanted echo signals. The unwanted objects are usually located far from the microwave inductor 1.

To solve this technical problem, a filter may be used to remove frequency differences larger than a predetermined value and thus remove the objects beyond a predetermined value. The objects beyond the predetermined value may be considered as unwanted objects. Removing the frequency differences larger than the predetermined value may save the time for the later calculation or determination.

Moreover, the microwave induction control system according to the second embodiment of the present disclosure may further filter interference signals from the frequency difference signals (obtained from the echo signals). To this end, a maximum amplitude value in a power spectrum may be obtained. Amplitude values indicate the intensities of the echo signals. The maximum amplitude value indicates the echo signal, which is most likely caused by a target object. However, an unwanted object may also generate an interference signal with a large amplitude value.

To address this technical problem, according to the second embodiment of the present disclosure, a frequency-domain complex signal sampling value obtained at each time point during a period may be added or summed together. For example, the period may be 200 ms. A sum calculation is performed every 2 ms. Thus, during one period, the sum calculation is performed for 100 times and one summed value is obtained. After predetermined periods, e.g., 30 periods, 30 summed values may be obtained. The largest summed value among the 30 summed values is determined as the maximum amplitude value. This is because an interference signal with a large amplitude value cannot appear at each time point during the one period. Thus, the microwave induction control system according to the second embodiment of the present disclosure may substantially remove the interference signals.

In addition, the microwave induction control system according to the second embodiment of the present disclosure may also more dynamically update the threshold values to further improve the accuracy in determining the target object. Specifically, the threshold values used in the present disclosure may be determined based on the changes of the environment, e.g., weather or an electronic device installed in the bathroom. The change in the interference signals caused by the environment are less than a change in the emitted signal or the echo signal caused by a target object. Thus, the microwave induction control system may determine the threshold value according to the environment at a time interval. The microwave induction control system may store a threshold value currently used by the system (the "current in-use threshold value") in the memory. A threshold value obtained at the next time point (the "next threshold value") may be compared with the current in-use threshold value. When the difference between the next threshold value and the current in-use threshold value is smaller than a predetermined value, the next threshold value replaces current in-use threshold value to be a new current in-use threshold value used by the microwave induction control system. When the difference between the next threshold value and the current in-use threshold value is larger than or equal to the predetermined value, the next threshold value does not replace the current in-use threshold value.

Furthermore, the microwave induction control system according to the second embodiment of the present disclosure may further prevent the interference caused by the water supplied by the water outlet 4. Water supplied by the water outlet 4 may interfere the detection of a target object performed by the microwave inductor 1. Although the interference caused by the water is smaller than that caused by a human body, the microwave induction control system according to the second embodiment may further improve the accuracy of the detection performed by the microwave inductor 1 by avoiding the interference caused by the water.

To this end, when the target object is detected by the microwave inductor 1, the control device 13 may control the solenoid valve 2 connect the water inlet pipe 3 and the water outlet pipe 6 so as to supply water to the ceramic basin 5. While the water is being supplied, the control device 13 may generate a first pulse signal and transmit the first pulse signal to instruct the microwave inductor 1 to stop detecting the target object. This is because, as discussed above, the water being supplied may interfere the detection by the microwave inductor 1. The control device 13 may preset a predetermined water supply period, e.g., 20 seconds. In an embodiment, microwave induction control system according to the second embodiment of the present disclosure may further comprise a timer. After the predetermined water supply period elapses, the control device 13 may disconnect the water inlet pipe 3 and the water outlet pipe 6, generate a second pulse signal, and transmit the second pulse signal to instruct the microwave inductor 1 to start detecting the target object again.

The above embodiments merely disclose several embodiments of the present disclosure. The description for the above embodiments is specific and detailed, but it should be understood as a limitation to the scope of the present disclosure. It should be noted that those of ordinary skills in the art may make a plurality of amendments and improvements without departing from the conception of the present disclosure, and these amendments and improvements shall all fall within the protection scope of the present disclosure. Therefore, the patent protection scope of present disclosure should be subject to the claims appended.

We claim:

1. A microwave induction control system for a water outlet device, the microwave induction control system comprising:
   a transmitting antenna configured to transmit electromagnetic waves toward a water outlet of an outlet pipe of the water outlet device;
   at least one receiving antenna configured to receive at least one radio frequency echo signal;
   a solenoid valve configured to control an inlet pipe and the outlet pipe of the water outlet device; and
   a control device communicatively connected to the solenoid valve and configured to perform an analysis on the at least one radio frequency echo signal received by the at least one receiving antenna and drive the solenoid valve to control the inlet pipe and the outlet pipe to be connected with each other or disconnected from each other according to an analysis result.

2. The microwave induction control system for the water outlet device according to claim 1,
   wherein the microwave induction control system comprises at least two receiving antennas respectively arranged on two sides of the transmitting antenna and configured to receive at least two radio frequency echo signals,
   wherein the microwave induction control system comprises a microwave inductor and the microwave inductor comprises a microwave transceiver chip,
   wherein a radio frequency input of the microwave transceiver chip is communicatively connected to the transmitting antenna and the at least two receiving antennas,
   wherein an intermediate frequency output of the microwave transceiver chip is communicatively connected to an input of the control device, and
   wherein the microwave transceiver chip is configured to convert the at least two radio frequency echo signals received by the at least two receiving antennas into at least two in-phase quadrature (IQ) intermediate frequency signals and configured to send the at least two IQ intermediate frequency signals to the control device.

3. The microwave induction control system for the water outlet device according to claim 2,
   wherein the radio frequency input of the microwave transceiver chip is communicatively connected to the transmitting antenna and the at least two receiving antennas,
   wherein a modulation end of the microwave transceiver chip is communicatively connected to an output of the control device,
   wherein the intermediate frequency output of the microwave transceiver chip is communicatively connected to the input of the control device, wherein the modulation end of the microwave transceiver chip is configured to receive a modulation waveform of the control device, generate a corresponding radio frequency modulation waveform as a transmission signal, and send the transmission signal to the transmitting antenna for transmission, and wherein the radio frequency input of the microwave transceiver chip is configured to receive the at least two radio frequency echo signals of the at least two receiving antennas, mix the received at least two radio frequency echo signals with the transmission signal respectively, and then perform frequency selection to obtain the at least two IQ intermediate frequency signals.

4. The microwave induction control system for the water outlet device according to claim 3, wherein the microwave inductor further comprises a filter and an intermediate frequency amplifier, wherein the intermediate frequency output of the microwave transceiver chip is communicatively connected to the input of the control device by the filter and the intermediate frequency amplifier successively, and wherein a distance corresponding to an allowable passing frequency of the filter is greater than or equal to a distance between the transmitting antenna and the water outlet.

5. The microwave induction control system for the water outlet device according to claim 1, wherein a microwave inductor is installed below a side of a basin under a faucet, wherein the transmitting antenna faces opposite to the outlet pipe, and wherein the at least two receiving antennas are symmetrically arranged about a plane in which the transmitting antenna and the outlet pipe are located.

6. A control method of a microwave induction control system for a water outlet device, the microwave induction control system comprising:
    a solenoid valve configured to control an inlet pipe and an outlet pipe to be connected with each other or disconnected from each other; and
    a microwave inductor, comprising:
        a transmitting antenna configured to transmit electromagnetic waves toward a water outlet of the outlet pipe;
        at least one receiving antenna configured to receive at least one radio frequency echo signal; and
        a control device communicatively connected to the solenoid valve and configured to analyze the at least one radio frequency echo signal received by the at least one receiving antenna and drive the solenoid valve to control the inlet pipe and the outlet pipe to be connected with each other or disconnected from each other according to analysis result;

the control method comprising:
    analyzing the at least one radio frequency echo signal received by the at least one receiving antennas; and
    driving the solenoid valve to control the inlet pipe and the outlet pipe to be connected with each other or disconnected from each other according to the analysis result.

7. The control method of the microwave induction control system for the water outlet device according to claim 6, wherein the microwave induction control system comprises at least two receiving antennas respectively arranged on two sides of the transmitting antenna and configured to receive at least two radio frequency echo signals, wherein analyzing the radio frequency echo signals received by the at least two receiving antennas comprises:
    calculating a total power spectrum of the at least two radio frequency echo signals received by the at least two receiving antennas;
    detecting and recording a maximum amplitude value in the power spectrum; and
    determining a target angular deviation according to the maximum amplitude value, and wherein driving the solenoid valve to control the inlet pipe and the outlet pipe to be connected with each other or disconnected from each other according to the analysis result comprises:
    determining whether an effective target object is present according to the target angular deviation and the maximum amplitude value,
    wherein when an effective target object is present, the solenoid valve is driven to control the inlet pipe to be connected to the outlet pipe, and
    wherein when the effective target object is not present, the solenoid valve is driven to control the inlet pipe to be disconnected from the outlet pipe.

8. The control method of the microwave induction control system for the water outlet device according to claim 7, wherein calculating the total power spectrum of the radio frequency echo signals received by the at least two receiving antennas, detecting and recording the maximum amplitude value in the power spectrum, and determining the target angular deviation according to the maximum amplitude value comprise:
    converting the at least two radio frequency echo signals into at least two IQ intermediate frequency signals respectively;
    after each preset frame of time, acquiring the at least two IQ intermediate frequency signals as one frame of data and performing a calculation for the frame of data:
        performing analog-to-digital conversion on the at least two IQ intermediate frequency signals respectively to obtain at least two IQ time-domain complex signals respectively;
        performing frequency-domain transform processing on the at least two IQ time-domain complex signals respectively to obtain IQ frequency-domain complex signals corresponding to each IQ complex signal,
            wherein each IQ frequency-domain complex signal comprises a plurality of frequency-domain complex signal sampling values, and
            wherein each frequency-domain complex signal sampling value corresponds to a distance and a speed, and
            wherein a corresponding relationship between the frequency-domain complex signal sampling value and the distance and a corresponding relationship between the frequency-domain complex signal sampling value and the speed are obtained by the frequency-domain transform processing;
    calculating a total power spectrum of the at least two IQ frequency-domain complex signals, wherein the total power spectrum comprises a plurality of amplitude values corresponding to the distance and the speed;
    detecting and recording a maximum amplitude value in the power spectrum;

determining a distance corresponding to the maximum amplitude value as a maximum amplitude distance;

in a first IQ frequency-domain complex signal, searching a frequency-domain complex signal sampling value corresponding to the maximum amplitude distance as a first to-be-compared complex signal sampling value;

in a second IQ frequency-domain complex signal, searching a frequency-domain complex signal sampling value corresponding to the maximum amplitude distance as a second to-be-compared complex signal sampling value; and calculating a phase difference between the first to-be-compared complex signal sampling value and the second to-be-compared complex signal sampling value as the target angular deviation.

9. The control method of the microwave induction control system for the water outlet device according to claim 8, wherein determining whether the effective target object is present according to the target angular deviation and the maximum amplitude value comprises:

determining the effective target object as present when the maximum amplitude value is greater than an amplitude threshold, the target angular deviation is less than an angle threshold, an absolute value of the speed corresponding to the maximum amplitude value is greater than a speed threshold, and the speed corresponding to the maximum amplitude value points has a direction toward the water outlet.

10. The control method of the microwave induction control system for the water outlet device according to claim 9, wherein determining whether the effective target object is present according to the target angular deviation and the maximum amplitude value comprises:

when the maximum amplitude value is greater than the amplitude threshold, the target angular deviation is less than the angle threshold, the absolute value of the speed corresponding to the maximum amplitude value is greater than the speed threshold, and the speed corresponding to the maximum amplitude value points has the direction toward the water outlet, preliminarily determining the target object as present; and when the target object is preliminarily determined as present in N or more than N frames in continuous M frames, determining the target object as present.

11. The control method of the microwave induction control system for the water outlet device according to claim 9, the control method further comprising:

in every preset threshold detection time, performing:

acquiring maximum amplitude values of power spectrums of continuous multiple frames to form a frame sequence comprising a plurality of maximum amplitude values;

sorting the plurality of maximum amplitude values and obtaining an intermediate portion of the plurality of maximum amplitude values to calculate an average value to obtain an initial amplitude threshold;

multiplying a current amplitude threshold by a preset first weighted value N1 to obtain a weighted detection threshold, wherein the first weight value N1 is greater than 1; and when the initial amplitude threshold is less than the weighted detection threshold, updating the current amplitude threshold as a weighted value of the initial amplitude threshold and the current amplitude threshold.

12. The control method of the microwave induction control system for the water outlet device according to claim 11, wherein updating the current amplitude threshold as the weighted value of the initial amplitude threshold and the current amplitude threshold comprises:

when the current amplitude threshold is greater than the initial amplitude threshold, updating the current amplitude threshold as $A1 \times N2 + A2 \times N3$, wherein A1 is the initial amplitude threshold, N2 is a second weighted value, N3 is a third weighted value, A2 is the current amplitude threshold, and N2 is greater than N3; and when the current amplitude threshold is less than or equal to the initial amplitude threshold, updating the current amplitude threshold as $A1 \times N3 + A2 \times N2$, wherein A1 is the initial amplitude threshold, N2 is the second weighted value, N3 is the third weighted value, A2 is the current amplitude threshold, and N2 is greater than N3.

13. A control device of a microwave induction control system for a water outlet device, the control device comprising:

at least one processor; and a memory communicatively connected to the at least one processor, wherein the memory stores instructions configured to be executed by the at least one processor to execute a control method of the microwave induction control system for the water outlet device;

the microwave induction control system comprising:

a solenoid valve configured to control an inlet pipe and an outlet pipe to be connected with each other or disconnected from each other; and a microwave inductor, comprising:

a transmitting antenna configured to transmit electromagnetic waves toward a water outlet of the outlet pipe;

at least one receiving antenna configured to receive at least one radio frequency echo signal; and a control device communicatively connected to the solenoid valve and configured to analyze the at least one radio frequency echo signal received by the at least one receiving antenna and drive the solenoid valve to control the inlet pipe and the outlet pipe to be connected with each other or disconnected from each other according to analysis result;

the control method comprising:

analyzing the at least one radio frequency echo signal received by the at least one receiving antenna; and driving the solenoid valve to control the inlet pipe and the outlet pipe to be connected with each other or disconnected from each other according to the analysis result.

14. The microwave induction control system for the water outlet device according to claim 1, wherein the control device is further configured to perform the analysis by determining a time difference between a first time point when the transmitting antenna transmits an electromagnetic wave and a second time point when the at least one receiving antenna receives the at least one radio frequency echo signal, and wherein the control device generates the valve command in response to the determined time difference.

15. The microwave induction control system for the water outlet device according to claim 2, wherein the at least two receiving antennas are symmetrically arranged about the transmitting antenna so that the at least two receiving antennas are disposed on each side of the transmitting antenna at a substantially same distance from each side of the transmitting antenna.

16. The microwave induction control system for the water outlet device according to claim 1, wherein the control device is further configured to determine whether to update a current threshold being used in the analysis on the at least one radio frequency echo signal received by the at least one receiving antenna.

17. The microwave induction control system for the water outlet device according to claim 16, wherein the control device is further configured to compare an absolute difference between the current threshold and a new threshold with a predetermined value, wherein when the absolute difference between the current threshold and a new threshold is smaller than the predetermined value, the control device replaces the current threshold with the new threshold, and wherein the current threshold is determined by at least one environmental condition at a first time point and the current threshold is determined by at least one environmental condition at a second time point later than the first time point.

18. The control method of the microwave induction control system for the water outlet device according to claim 6, wherein the control device is further configured to perform an analysis on the at least one radio frequency echo signal received by the at least one receiving antenna by determining a time difference between a first time point when the transmitting antenna transmits an electromagnetic wave and a second time point when the at least one receiving antenna receives the at least one radio frequency echo signal, and wherein the control device generates a valve command in response to the determined time difference.

19. The control method of the microwave induction control system for the water outlet device according to claim 7, wherein the total power spectrum of the at least two IQ frequency-domain complex signals by squaring the two frequency-domain complex signals respectively and summing the squared results.

* * * * *